United States Patent [19]

Dayen

[11] Patent Number: 4,474,268
[45] Date of Patent: Oct. 2, 1984

[54] TORQUE AND/OR ROTATIONAL CONTROL APPARATUS

[75] Inventor: Leonid Dayen, Plymouth, Minn.

[73] Assignee: Horton Manufacturing Co., Inc., Minneapolis, Minn.

[21] Appl. No.: 369,327

[22] Filed: Apr. 16, 1982

[51] Int. Cl.$^3$ ............... F16D 55/42; F16D 65/847
[52] U.S. Cl. .................. 188/71.5; 188/71.6; 188/218 XL; 188/264 AA
[58] Field of Search ............ 188/71.5, 71.6, 72.4, 188/72.5, 73.1, 73.2, 250 F, 250 G, 264 A, 264 AA, 218 XL; 192/107 R, 113 A

[56] References Cited

U.S. PATENT DOCUMENTS

| | | | |
|---|---|---|---|
| 2,115,763 | 5/1938 | Burke | 192/113 |
| 2,369,328 | 2/1945 | Watts | 188/218 XL |
| 2,464,754 | 3/1949 | Tack | 188/218 XL |
| 2,627,325 | 2/1953 | Helsten | 188/264 A X |
| 2,728,422 | 12/1955 | Kelley | 188/264 |
| 2,908,358 | 10/1959 | Erickson | 188/72.5 |
| 3,119,468 | 1/1964 | Mossey | 188/250 F X |
| 3,516,522 | 6/1970 | Chamberlain | 188/264 |
| 3,603,435 | 9/1971 | Buzzard et al. | 188/218 XL |
| 3,623,579 | 11/1971 | Hendrickson et al. | 188/218 XL |
| 3,651,895 | 3/1972 | Whitfield | 188/71.6 |
| 3,805,935 | 4/1974 | Armstrong | 192/113 A |
| 3,862,678 | 1/1975 | Collins | 192/88 A |
| 3,899,054 | 8/1975 | Huntress et al. | 188/218 XL |
| 4,013,146 | 3/1977 | Gebhardt et al. | 188/71.6 |
| 4,096,926 | 6/1978 | Klaue | 188/71.4 |

FOREIGN PATENT DOCUMENTS

| | | |
|---|---|---|
| 1575813 | 1/1970 | Fed. Rep. of Germany . |
| 1600100 | 1/1970 | Fed. Rep. of Germany . |
| 1600001 | 2/1970 | Fed. Rep. of Germany . |
| 2260155 | 12/1974 | Fed. Rep. of Germany . |
| 3107025 | 2/1982 | Fed. Rep. of Germany . |
| 3120104 | 4/1982 | Fed. Rep. of Germany . |
| 1371158 | 10/1974 | United Kingdom . |
| 2097873 | 11/1982 | United Kingdom . |

OTHER PUBLICATIONS

Bulletin EB810-10 for the Wichita Multi-Range Disc Brake, Model MRD.
"Re-designed Air Cooled Brake Offers Wide Tension Control", *Design Engineering*, Mar. 1982, pp. 43, 44.

*Primary Examiner*—Duane A. Reger
*Attorney, Agent, or Firm*—Wicks & Nemer

[57] ABSTRACT

An external, multi-caliper brake for positive torque controlling as well as for controlling the rotation of a shaft is shown in the preferred brake embodiment of this invention as having a hub arranged to be mounted to the shaft with a longitudinally centrally located, finned friction disc mounted to the hub. A brake housing supports multiple brake calipers which are shown as including diaphragm operated, fluid pressure actuated pistons carrying brake pads which are caused to frictionally engage with the friction disc to rotationally control the shaft. The preferred friction disc is formed of two opposed, interlaced, internally finned component discs to create a serpentine, radial and circumferential, air cooling path for the friction disc and provide better heat transfer and brake efficiency. Another embodiment includes double fins to better cool not only the friction disc but the external calipers themselves. The calipers include quick brake pad change apparatus by use of pinned pad supports and positioning bosses.

32 Claims, 13 Drawing Figures

TORQUE AND/OR ROTATIONAL CONTROL APPARATUS

BACKGROUND AND SUMMARY

The present invention relates most generally to torque and/or rotational control devices such as clutches or brakes, generally to the overall configuration or assembly, friction disc cooling, and pad mounting for clutches or brakes, more particularly to caliper brakes, and most particularly to tension or torque control of external caliper brakes.

It is a continuous problem to provide clutches or brakes which are efficient, have high ability to transfer the heat energy generated in the engagement process and/or in a constant slipping arrangement, and are easy to maintain and operate. The present invention provides such apparatus.

The device of the present invention, in its most preferred brake form, is then an external, multi-caliper brake arranged to provide controlled torque to a shaft including a hub arranged to be mounted to this shaft. A longitudinally centrally located, internally finned friction disc is in turn mounted to the hub. The brake housing, in a preferred brake form, supports multiple brake cylinders or calipers, each of which in the most preferred form includes a diaphragm operated, fluid pressure actuated piston carrying a brake pad. The external calipers in the most preferred brake embodiment are then fluid actuated to frictionally engage the longitudinally centrally located finned friction disc and control the torque and/or rotation of the shaft. The multiplicity of calipers is for the intended purpose of broadening the range of torque and rotational control.

The friction disc described then provides increased cooling and increased brake efficiency by means of a finned arrangement. In the most preferred brake form, the friction disc is formed of two, opposed, interlaced, finned portions to create a serpentine, radial and circumferential air cooling path for the friction disc and provide better heat transfer and increased brake efficiency. Another preferred brake embodiment includes double sided fins to better cool not only the frictional disc itself but the external calipers themselves.

In addition to the overall assembly feature of the brake described and the particular feature of the finned disc, the brake described provides quick pad change and maintenance by use of a pinned pad support approach.

It is then an object of the present invention to provide more efficient torque and/or rotational control apparatus.

It is a further object of the present invention to provide torque and/or rotational control apparatus having increased heat transfer characteristics.

It is a further object of the present invention to provide torque and/or rotational control apparatus which is more easily maintained.

It is a further object of the present invention to provide torque and/or rotational control apparatus which has increased overall efficiency.

It is a further object of the present invention to provide torque and/or rotational control apparatus which has increased overall cooling characteristics.

These and further objects and advantages of the present invention will become clearer in the light of the following detailed description of illustrative embodiments of this invention described in connection with the drawings.

DESCRIPTION OF THE DRAWINGS

The illustrative embodiments of the present invention may best be described by reference to the accompanying drawings where.

All figures are drawn for ease of explanation of the basic teachings of the present invention only. The extension of the figures with respect to number, position, relationship, and dimensions of the parts to form preferred embodiments will be explained or will be obvious to those skilled in the related technologies from the explanation given.

Where used in the various figures of the drawings, the same numerals designate the same or similar parts. Furthermore, when the terms "right", "left", "front", "back", "vertical", "horizontal", "top", or "bottom", and similar terms are used herein, it should be understood that those terms have reference only to the structure shown in the drawings as it would appear to a person viewing the drawings and are utilized only to facilitate describing the invention.

DESCRIPTION

In the figures, an external caliper brake is shown and generally designated 10. Brake 10 includes the parts of: shaft 12 to which braking force is desired to be applied and which is desired to be rotationally controlled; hub 14 forming part of the connection between brake 10 and shaft 12; brake friction disc 16 connected to hub 14; and a plurality of external caliper type brake actuators or cylinders, for example eight are shown as 18–25. Each brake cylinder 18-25 includes a substantially identical piston 26, fluid fittings 28 of various configurations, fluid connection or air lines 30 of various lengths and configurations, and brake friction lining or brake pad 32 engaged by a first face of piston 26 to allow the introduction of pressurized fluid (air in the preferred embodiment) into lines 30 by a conventional controlled source not shown, through fittings 28, to apply pressurized fluid (air) to piston 26 by means of diaphragms 33 to allow pistons 26 to frictionally engage brake pads 32 against the braking surface of friction disc 16 and apply controlled frictional pressure to thereby apply braking power to shaft 12.

It is then recognized that brake 10 includes opposed but separated, frictionally engaged wear surfaces, with one of the wear surfaces being the piston 26 operated, replaceable brake pads 32 and the other wear surface being the opposed surface of brake friction disc 16.

More particularly, fluid (air) connections 30 are connected to fittings 28 which screw into bladder cylinder caps 34 which connect to cylinder housings 35 by means of screws or bolts 38 and which in turn are mounted to and form a part of an external housing 36 of brake 10 by means of a plurality of screws or bolts 100. As shown, housing 36 is in the form of rings mounting the remaining parts. Brake 10 may then be conventionally mounted to or in a further housing, motor, or other environment to apply a braking force to or to rotationally control shaft 12 in a conventional manner.

With this background, the novel differences and subtleties of the present invention over known prior brakes or clutches can be appreciated by those skilled in these technologies. One of such novel differences and subtleties of the present invention relates to the overall configuration or assembly of brake 10.

In its overall assembly, it may be noted first that brake actuating cylinders or calipers 18-25 are external or exterior of brake housing 36 and outside of the brake 10. Therefore, these calipers are furthest from the heat source of the frictional engagement between brake friction disc 16 and brake pads 32 and allow increased heat transfer and brake efficiency.

The longitudinally centrally located brake friction disc 16 of the overall assembly of brake 10 of a finned configuration has also been found to provide an increased heat transfer and efficiency for brake 10.

Still further with regard to the overall assembly and this novel and subtle feature of brake 10 according to the present invention, a pinned brake pad connection assembly combines with the external calipers 18-25 and the internally positioned and finned brake disc 16 to allow a rapid and quite simple brake pad change, thus reducing replacement time, increasing brake utility, and allowing ease of maintenance.

Still further, the contribution of a diaphragm operated, external caliper type brake to the overall assembly of brake 10 has been found to provide a brake always ready to work by eliminating the disadvantage of a spring return working against the applied braking force. That is, with the diaphragm approach, a minimum gap will automatically be maintained between the friction disc 16 and the brake pads 32 by use of the air between these two moving surfaces and the differential effect of these two moving surfaces. A minimum gap is then maintained, and the brake is always ready to work with a high efficiency.

This combination, configuration, and overall assembly has been found to yield surprisingly and satisfyingly high braking efficiency and to allow a brake such as brake 10 according to the present invention which is easy and simple to maintain, allows rapid interchange of the wear parts, including the brake pads, provides increased efficiency, increased heat transfer characteristics, increased overall cooling characteristics, and greater heat dissipation.

With the foregoing explanation, the next novel feature and subtle difference of the present invention may be explained and understood by those skilled in the related technologies. This next feature is that the longitudinally centrally arranged friction disc 16 of the present invention is of a finned configuration. In particular, brake friction disc 16 in a first embodiment shown is in the form of two single sided, similarly configured, component discs 40 having radially extending fins 42 projecting perpendicularly from one side of disc 40. This configuration then allows a dramatically simplified casting over previous known internal cavity discs while outperforming them.

Disc 40 then has an outer edge or periphery 44 and an inner circumference or edge 46. Adjacent the center of disc 40, adjacent inner edge 46 and in an integral ring of material 48, are formed a plurality of mounting bores 50 at regular intervals. Mounting bores 50 are then formed, for example, at the 120° /240° /360° circumferential points, circularly around inner edge 46, but out of radial alignment with fins 42 to thus allow the two similarly or identically configured discs 40 to form a single interposed fin, friction disc 16 according to the present invention, as is also explained elsewhere.

Also formed in ring 48 are a plurality of circumferentially elongated ventilation or air cooling entry bores or ports 52, 54, and 56. Cooling bores 52, 54, and 56 are then interrelated with mounting bores 50 such that cooling bore 52 is approximately at the 180° circumferential point, and cooling bore 54 is approximately at the 300° circumferential point, and cooling bore 56 is approximately at the 60° circumferential point.

Fins 42 are then formed from relatively thin upstanding members which radially extend substantially from a position just beyond ring 48 adjacent the inner disc edge 46 to adjacent the outer disc edge 44, but with end space for the passage of air circumferentially around disc fins 42 when disc 40 is in rotational operation as a part of friction disc 16, as is also explained elsewhere.

Each friction disc 16 is then preferably comprised of two substantially identical, single sided component discs 40 overfitted and interrelated to circumferentially regularly interweave fins 42 in a longitudinally spaced relation. Also, the fins 42 extend from the surface of their respective disc 40 a distance along the longitudinal axis of shaft 12 which also allows the passage of air around the longitudinal ends or internal edges of the fins. That is, the fins 42 do not extend the entire longitudinal distance between the facing discs 40, and thus the fins 42 do not touch the surface of the opposing discs 40. Fins 42 then form a true heat radiating fin, and not a bridging, heat conductive path between the surfaces of opposing discs 40. This is important to the present invention. That is, with the spacing of the fins 42 being less than the spacing between the component discs 40, thermal contact of the heat radiating fins 42 of the first component disc 40 with the second component disc 40 and direct heat transfer therebetween is prevented. The interrelationship of the two discs 40 forming friction disc 16 then is of opposed and alternate projections (fins 42) having internal edges or ends spaced from the surface of the opposing disc 40. As shown, a serpentine air path is then created.

A cooling cavity is then formed between intake ports 52, 54, and 56 formed adjacent the center of friction disc 16 between the inner surfaces of the first and second component discs 40 of friction disc 16, and the periphery of component discs 40. As friction disc 16 is then rotated about its axis, air can enter the air cooling chamber formed, as described above, through the cooling air entry ports 52, 54, and 56, pass through the air cooling chamber by a serpentine path, radially and also circumferentially, between the first and second component discs, and around the heat radiating fins 42 which are arranged in a meshed but spaced relationship in the air cooling chamber, past the peripheries of the first and second component discs 40, and to the atmosphere to allow increased heat transfer, cooling and efficiency of the device 10.

To assemble discs 40 to form friction disc 16, discs 40 are arranged with fins 42 facing one another and moved in an opposed fashion upon hub 14. As shown, hub 14 includes a tab 58 extending radially outward of hub 14. Tab 58 is then captured by opposed rings 48 of opposed discs 40 allowing bolts 106 to pass through opposed bores 50 and through bores 60 in tab 58. Because of the designed nonalignment of fins 42 with bores 50, fins 42 of opposed discs 40 then automatically interweave in a regular, alternate, overfitted, and interrelated manner as shown and described without the necessity of alignment. Brake housings 36 and brake calipers 18-25 may then be assembled to encapsulate friction disc 40.

With the foregoing, a further subtlety and novel difference of the friction disc 16 of the present invention can be explained and understood. With the interposed fins 42 and serpentined, radial and circumferential path described, an increased surface cooling area is used to thereby increase the cooling efficiency of brake 10. Further, it will now be appreciated that cooling air entering friction disc 16 adjacent hub 14 and through cooling ports 52, 54, and 56 can then move through friction disc 16 not only radially, as has been accomplished in known prior brakes, but also circumferentially as illustrated in the drawings. This combination of a radial and circumferential movement of cooling air then also allows a mixing and turbulence which has also been found to increase efficiency. It has then been found that the present design takes advantage of a higher proportion of the theoretical cooling area available, increases residence time of cooling air versus cooling surfaces, and operates by conduction and convection rather than by conduction alone. Further, it has been found that the faster shaft 12 moves, the more braking power may be required. It has further been found that the faster shaft 12 moves, the more heat dissipation is achieved by the design of the present invention at least through an increased turbulence.

With the foregoing explanation, the next novel feature and subtle difference of the present invention may be explained and understood by those skilled in these technologies, that of the pinned pad arrangement.

Calipers or cylinders 18-25 include brake pads 32 shown in a pentagonal shape with the radially outward edge rounded. Four notches 62-65 are formed, one to each side, of brake pad 32, with notch 64 formed in the rounded radially outward edge.

Piston 26 is similarly shown as pentagonal in shape and including two bosses 68 and 70 formed in generally radial alignment, with boss 68 formed radially outward of boss 70. That is, bosses 68 and 70 are formed on a first face of piston 26 adjacent the opposed wear surfaces formed by pads 32 and friction disc 16. At generally the same radial position on piston 26 are two circumferentially spaced bores 72 and 74. Pins 76 and 78 are pressed into and carried by brake housing 36 and in cylinder housing 35 in particular to extend longitudinally of brake 10 and thus parallel to shaft 12. Piston 26 includes an outwardly facing reduced portion 80 which interfits with a bore 82 in cylinder housing 35.

To assemble brake cylinders 18-25, as reduced portion 80 of piston 26 is then inserted into bore 82, pins 76 and 78 are inserted into bores 72 and 74, respectively. Pistons 26 then reciprocally move upon pins 76 and 78, as is also explained elsewhere. Brake pad 32 may then be placed upon piston 26 such that boss 68 is positioned within notch 64, boss 70 is positioned within notch 62, pin 76 is positioned within notch 63, and pin 78 is positioned within notch 65. Brake pad 32 is then uniquely captured upon piston 26 as between bosses 68 and 70 and pins 76 and 78 and also reciprocally moves on pins 76 and 78.

It may now be appreciated that the replaceable brake pad 32 arrangement of the present invention is useable in various environments and devices including opposed but separated frictionally engaged wear surfaces, where at least one of the wear surfaces includes a replaceable pad, such as 32, mounted adjacent an opposed wear surface, such as friction disc 16.

The length of pins 76 and 78 is such that they extend to the end of the stroke of piston 26 closest to friction disc 16, and include a further length to extend into the replaceable brake pads 32 carried by pistons 26 to then capture and position replaceable pads 32 over the entire stroke of pistons 26. Pins 76 and 78 must then be of an overall length just less than the minimum separation distance between the face of piston 26 and the opposed wear surface of friction disc 16, at the minimum extension of piston 26 within cylinders 18-25.

It can then be further appreciated that the change of replaceable brake pads 32 according to the present invention may be accomplished without the actual removal of any brake parts. This is done by simply loosening screws 100 to thereby retract pins 76 and 78 a distance only equal to the thickness of pads 32. In this fashion, pins 76 and 78 will be withdrawn from pads 32, and the pads may be removed by hand. Since cylinders 18-25 are exterior of brake 10 and since the loosening of screws 100 provides replacement access to brake pads 32, new pads may then be slipped onto bosses 68 and 70, the screws or bolts 100 retightened, and a pad change has been accomplished without the actual removal of any brake part of brake 10.

Another subtle feature and novelty of the pin arrangement according to the present invention may now be appreciated by those skilled in the related technologies. Utilizing capturing bosses 68 and 70 may prevent replaceable brake pad or brake lining 32 from actually falling off the face of piston 26 when the lining wear is such as to maintain only a tenuous grip by pins 76 and 78. Bosses 68 and 70 then yet retain a positioning hold on replaceable brake pads 32, and aid in preventing pads 32 from falling off. That is, since capturing bosses 68 and 70 are arranged to extend in the direction of pins 76 and 78 a distance approximately equal to the desired replacement pad thickness at the desired time of pad replacement, bosses 68 and 70 retain their positioning hold on replaceable brake pads 32 over the intended life of the pads.

Also because bosses 68 and 70 are arranged to extend from the face of pistons 26 in the direction of pins 76 and 78 a distance designed to be approximately equal to the minimum pad replacement thickness, bosses 68 and 70 are arranged to frictionally contact and rub on friction disc 16 just before pad 32 disappears through use. The attendant metal on metal squeal can then be an audible signal to an operator that new brake pads 32 are needed.

Other conventional connection and/or mounting parts 102, 104, 106, 108, 110, 114, 116, 118, and 120 are provided along with mounting and access bores 112 formed around the outer periphery of brake housing 36. Bores 112 are then used for various purposes, for example to allow the positioning of air lines 30 therethrough.

It will further be recognized that mounting studs 110 may be suitably connected to a device, platform, or other means against which the rotational movement or slipping of shaft 12 is desired to be controlled, and true positioning of external housing 36 can be achieved by means of shifting nuts 114.

It is now clear that the teachings of the present invention are not restricted to the numbers of calipers as shown. For example, the utilization of the teachings of the present invention with respect to an eight caliper double sided brake is illustrated in FIGS. 9-13 where the same or similar parts are given the same or similar numbers. It is then clear that the extension of the present invention with respect to other arrangements is well within the skill of those familiar with related technologies.

Figure 1:
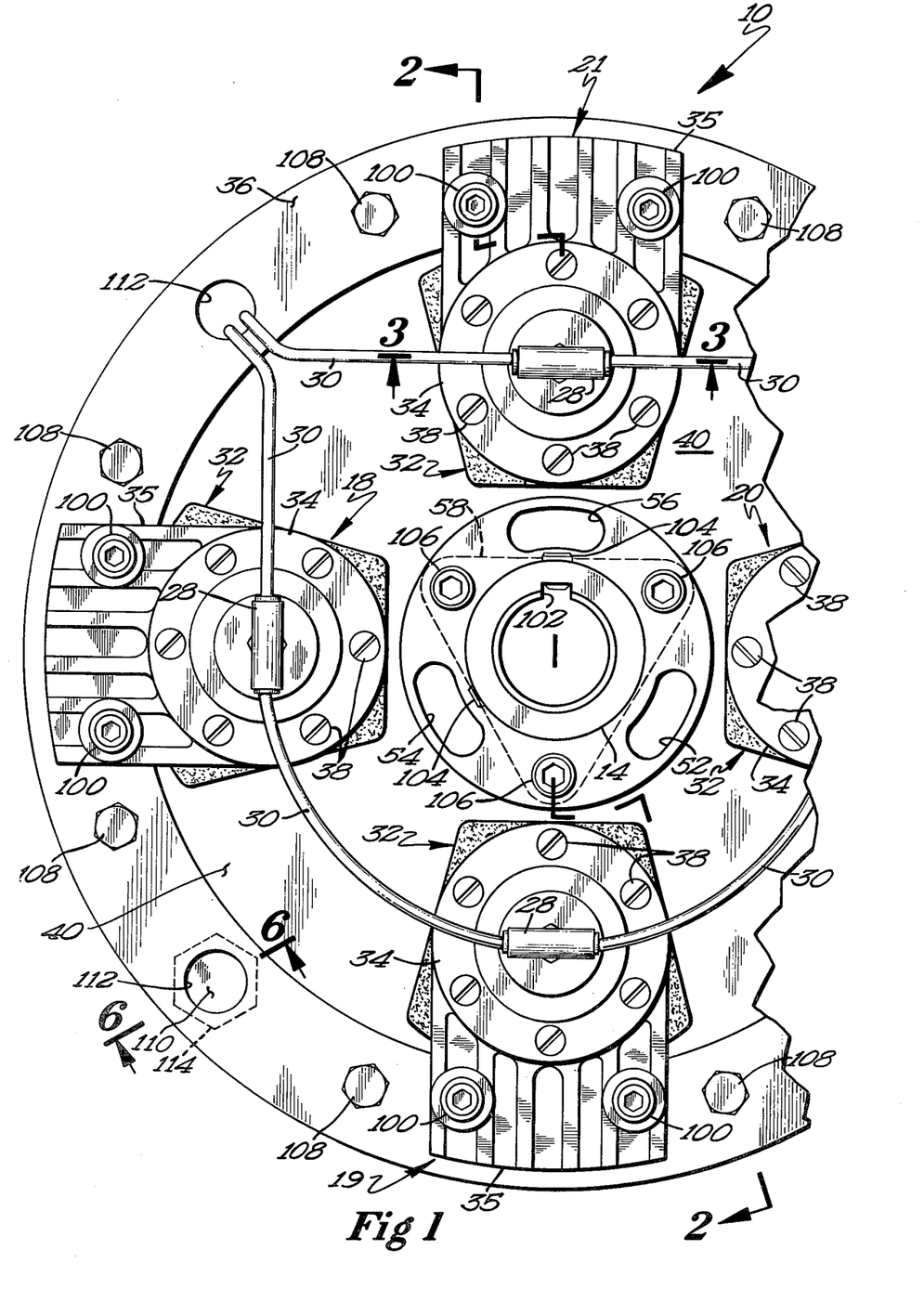
FIG. 1 is a front elevational view of a four caliper double sided brake constructed according to teachings of the present invention.
Figures 2, 3:
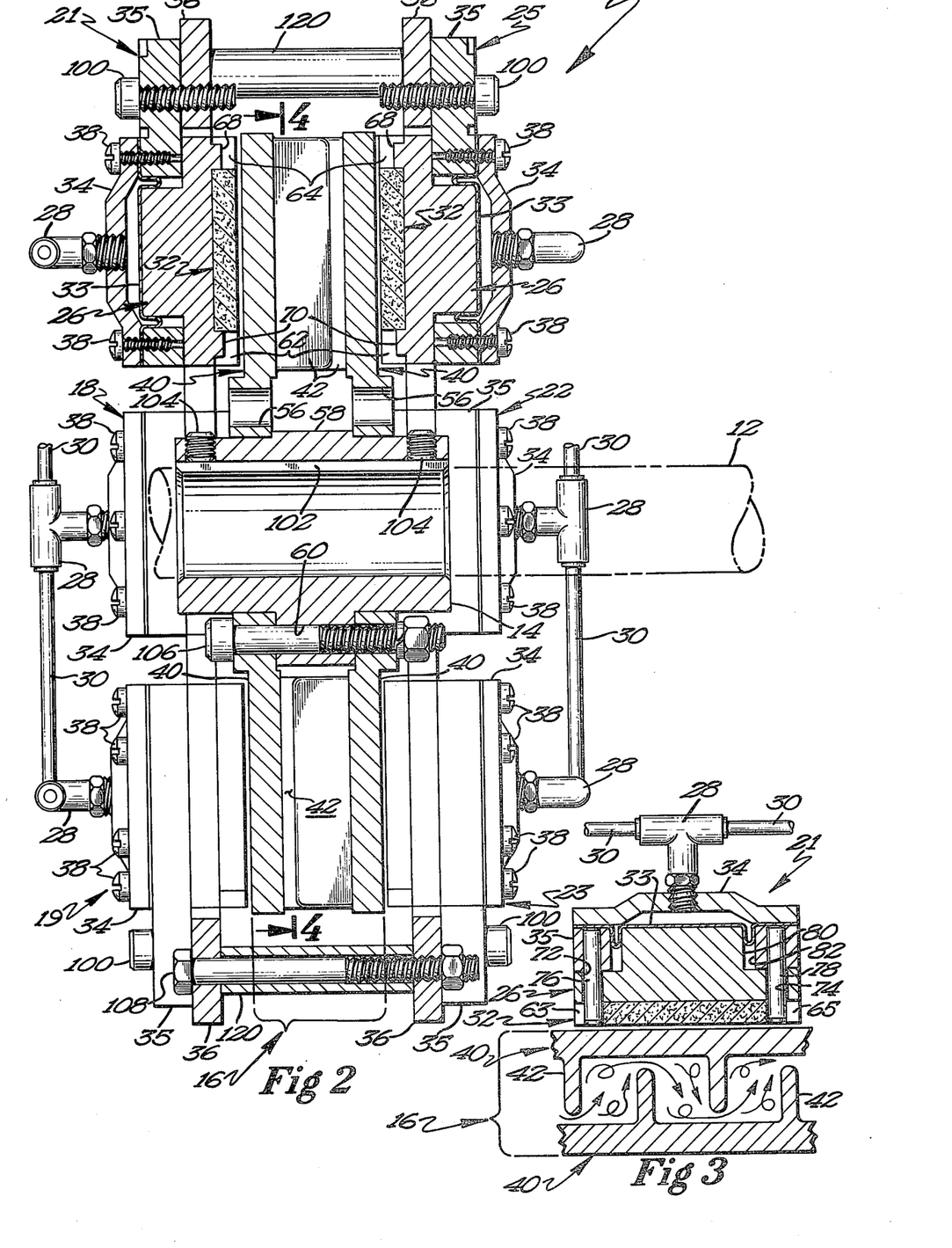
FIG. 2 is a cross-sectional view of the brake of FIG. 1 according to section lines 2—2 of FIG. 1.
FIG. 3 is a partial cross-sectional view of a portion of the brake of FIG. 1 according to section lines 3—3 of FIG. 1.
Figures 4, 5:
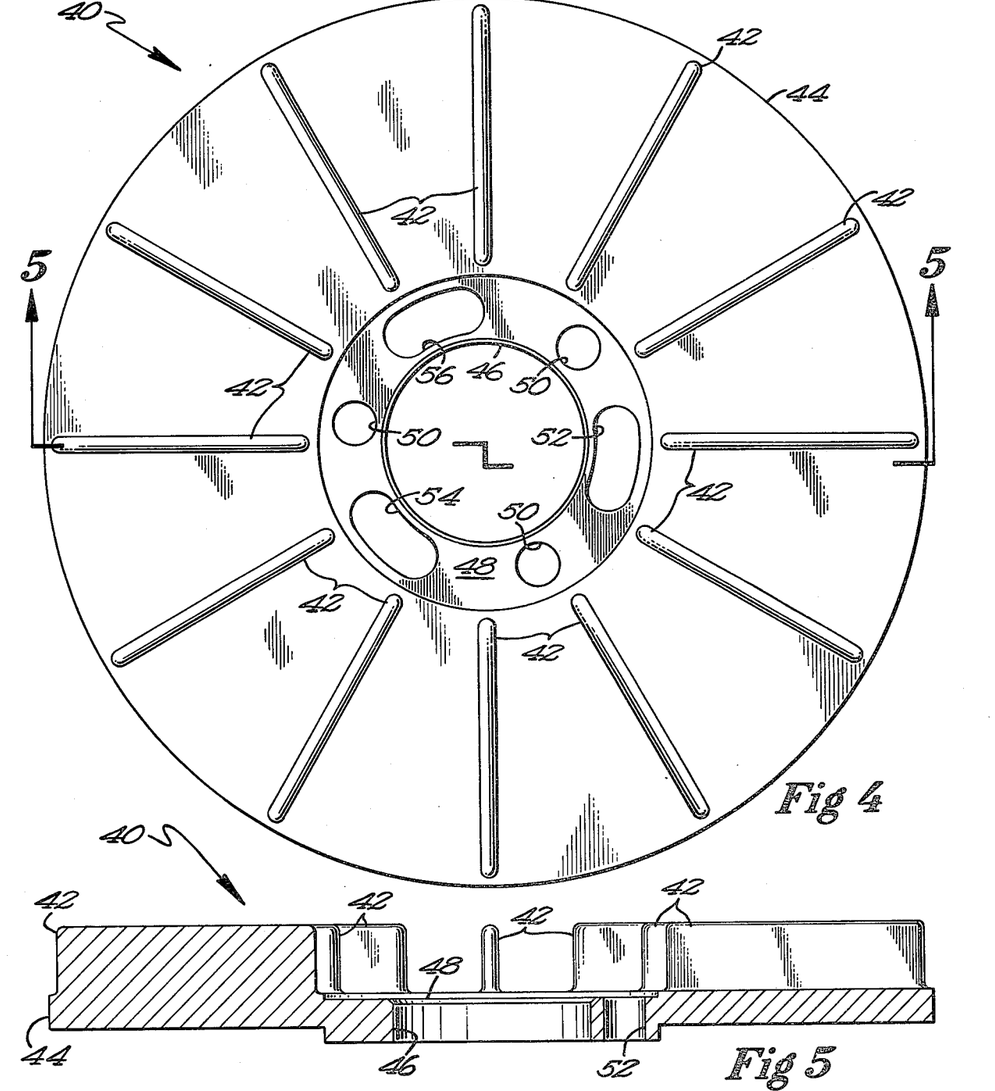
FIG. 4 is a front elevational view of the finned frictional disc according to the present invention as utilized in the brake of FIGS. 1, 2, and 3.
FIG. 5 is a cross-sectional view of the finned frictional disc of FIG. 4 according to the section lines 5—5 of FIG. 4.
Figure 6:
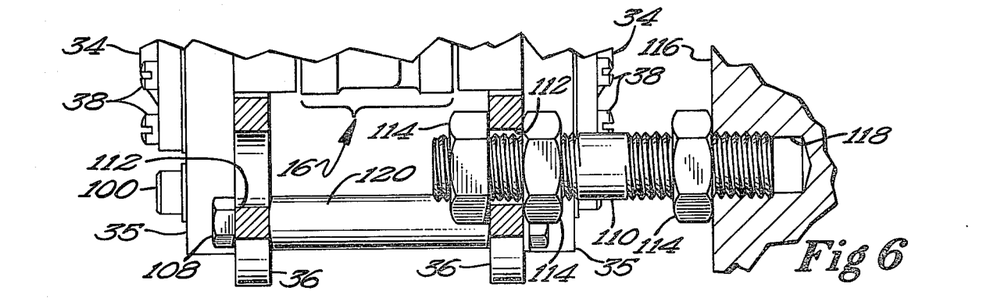
FIG. 6 is a partial sectional view of a mounting for the brake of FIG. 1 according to section lines 6—6 of FIG. 1.
Figures 7, 8:
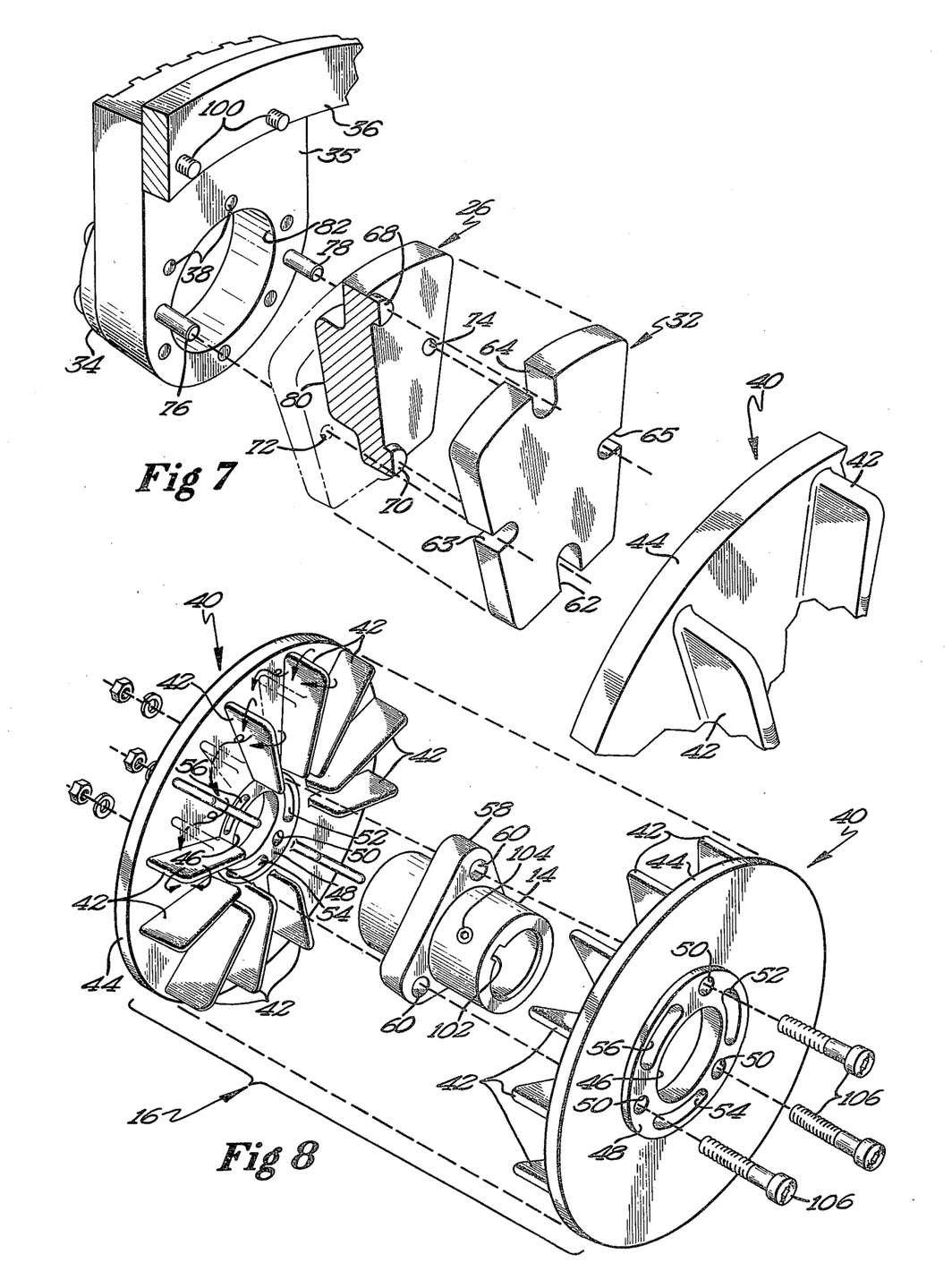
FIG. 7 is an exploded perspective view of the brake pad arrangement of the brake of FIG. 1.
FIG. 8 is an exploded perspective view of the hub and finned frictional disc arrangement of the brake of FIG. 1.
Figure 9:
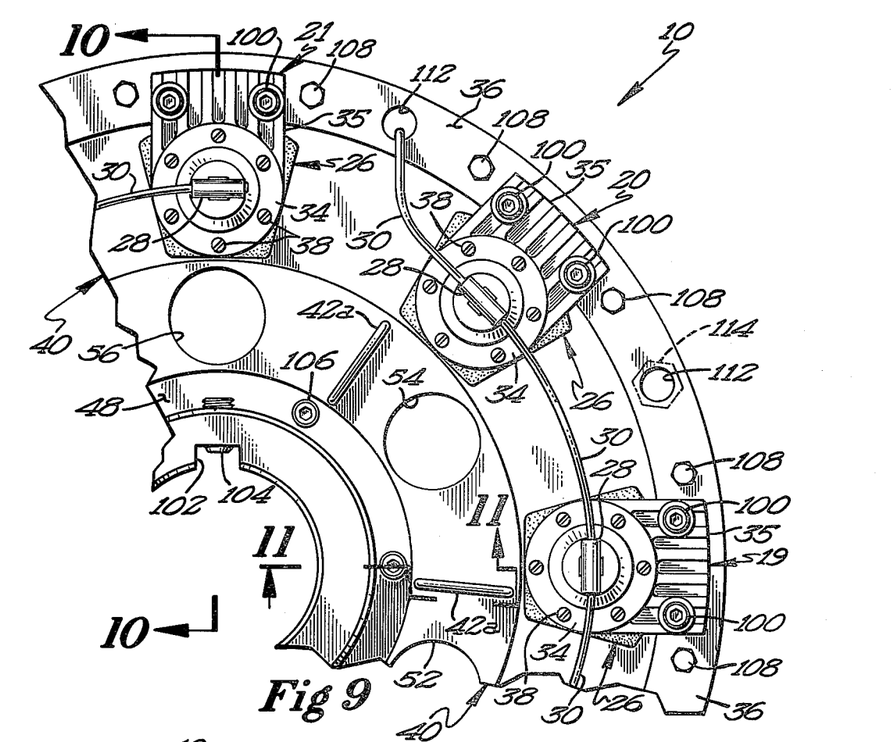
FIG. 9 is a partial plan view of an eight caliper double sided brake, also constructed according to the teachings of the present invention.
Figure 10:
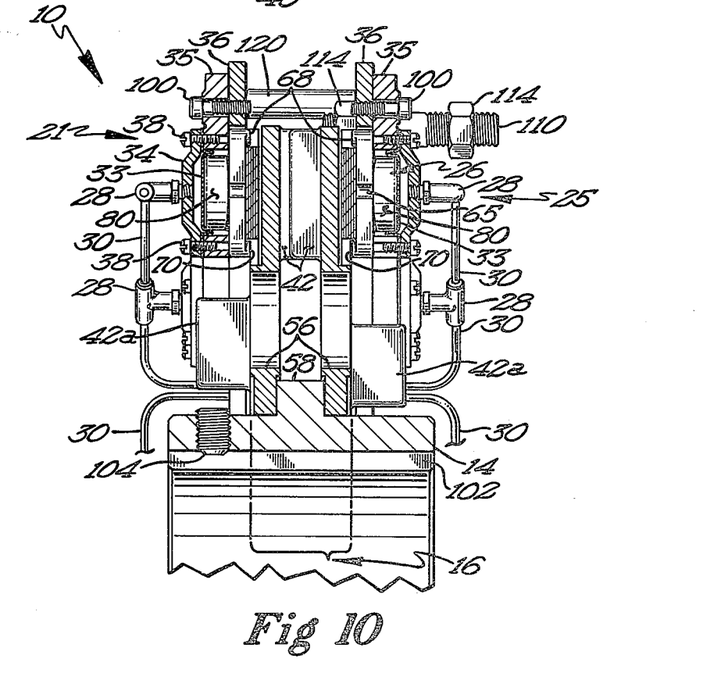
FIG. 10 is a partial sectional view of the brake of FIG. 9 according to section lines 10—10 of FIG. 9.
Figures 11, 12, 13:
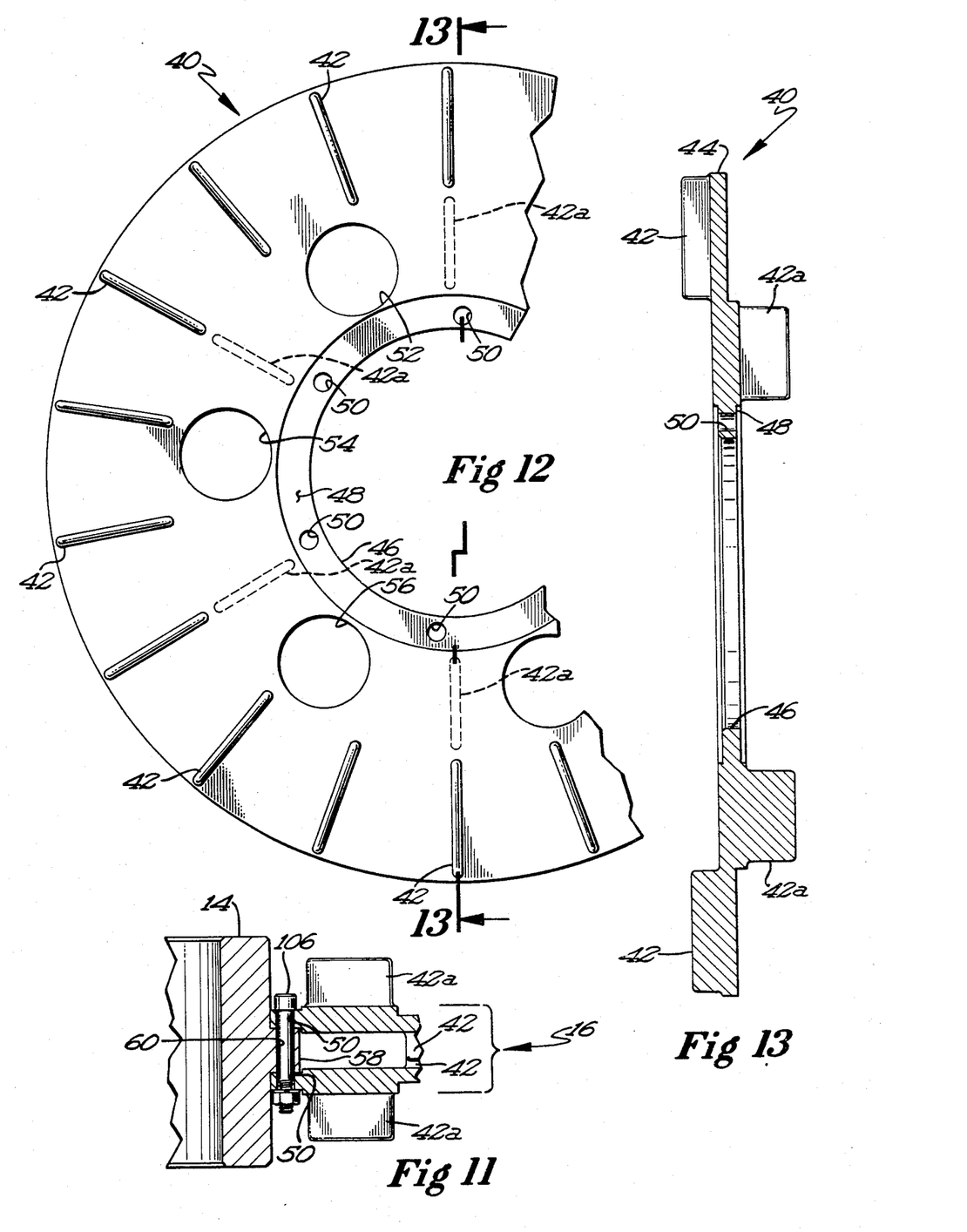
FIG. 11 is a partial sectional view of the brake of FIG. 9 according to section lines 11—11 of FIG. 9.
FIG. 12 is a partial plan view of an alternate embodiment finned brake friction disc according to the present invention as utilized in the brake of FIGS. 9, 10, and 11.
FIG. 13 is a sectional view of the finned brake friction disc of FIG. 12 according to the section lines 13—13 of FIG. 12.

The embodiment of FIGS. 9-13 does, however, provide an additional advantage. As seen, a second set of exterior fins 42a are provided on friction disc 16. Exterior fins 42a then extend externally of friction disc 16 and adjacent the external calipers shown to thereby cool the external calipers as friction disc 16 rotates. Thus, the friction disc 16 of the FIGS. 9-13 embodiment not only provides the advantages given with respect to the friction disc of FIG. 4, but the additional advantage of additionally cooling the external calipers by use of external fins 42a.

Now that the basic teachings of the present invention have been explained, many extensions and variations will be obvious to one having ordinary skill in the related technologies. For example, although the present invention has been explained with respect to a brake, it is now clear that the teachings apply to clutches also. That is, the present invention then applies to devices for providing rotational control between first members and second members, with at least the first member being rotatable about an axis. In the brake described, the first and second members may comprise the shaft 12 and brake housing 36. Generally, however, all that is necessary is that one member include a friction disc, such as friction disc 16, for controlled, selective contact with a friction engagement surface on another member, such as pads 32. It will then be recognized that a friction disc could be a frictional member of a clutch and the other friction engagement surface be the clutch pads.

Further, although the present invention has been described with respect to a shaft to be rotationally controlled, it is now clear that the present invention is general in application and therefore provides rotational control between various members, including shafts and hubs, or hubs and hubs, or hubs and shafts, or other like combinations, and it does not matter which is a stationary member and which is desired to be rotationally controlled with respect to the other.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is indicated by the appended claims, rather than by the foregoing description, and all changes which come within the meaning and range of equivalency of the claims are intending to be embraced therein.

What is claimed is:

1. In an exterior caliper brake including a brake housing and arranged for providing rotational control between the brake housing and a shaft, including a hub arranged to be operationally connected to the shaft, a brake friction disc having a center and a periphery operationally connected to the hub, and a plurality of brake cylinders externally arranged on the brake housing, each including a fluid actuated piston and a replaceable brake pad engaged by the piston to apply a controlled frictional pressure between the brake friction disc and the brake housing, the replaceable brake pads and the brake friction disc comprising opposed wear surfaces, to thereby controllably apply braking power between the brake housing and the shaft, the improved overall brake assembly configuration, comprising, in combination:

(a) the brake friction disc arranged longitudinally and centrally of the brake cylinders, along the hub, and radially around the hub, and including internal heat radiating fins, with the heat radiating finned longitudinally centrally located brake friction disc comprising two longitudinally spaced component discs interconnected together only at the hub, with the component discs including cooling air entry ports formed therethrough adjacent to the hub and including cooling air exits formed adjacent the periphery, with the heat radiating fins extending generally longitudinally from the surface of the component discs in an opposed, non-touching fashion, internally of the brake friction disc, but a longitudinal distance less than the longitudinal spacing of the component discs to define an air cooling chamber internally of the brake friction disc, between the air entry ports, around the heat radiating fins, and out the cooling air exits of the brake friction disc to allow a serpentine path and passage of cooling air radially and also circumferentially inside the brake friction disc to allow increased heat transfer, cooling, and brake efficiency;

(b) the plurality of external brake cylinders being formed in the brake housing and arranged radially outwardly of the hub and circumferentially around the hub with each brake cylinder being diaphragm operated allowing ready action and a minimum gap between the brake friction disc and the adjacent surface of the brake pad engaged by the piston; and (c) at least two pins carried by and extending from the housing in the direction of operation of the piston; apertures formed in the piston to receive the pins, the piston being reciprocably mounted on the pins by means of the apertures; with the replaceable brake pads being mounted on a first face of the piston adjacent the opposed wear surface of the brake friction disc; apertures formed in the replaceable pads to receive the pins, the replaceable pads being reciprocally mounted on the pins by means of the apertures; the pins being of a length sufficient to extend to the end of the piston stroke and a further length to extend into the replaceable pad carried by the piston and to capture and position the replaceable pad over the entire stroke of the piston but of an overall length less than the minimum separation distance between the first face of the piston and the opposed wear surface of the brake friction disc; whereby the overall brake assembly configuration provides increased heat transfer and cooling and a more efficient, lower maintenance brake.

2. The brake of claim 1 wherein the heat radiating fins are radially arranged substantially between the hub and the periphery of the friction disc but allowing the passage of air circumferentially about the internal edges of the fins; wherein the component discs and the hub are individual parts; wherein the spaced component discs are of an identical and interchangeable construction; and wherein the heat radiating fins of the spaced component discs are interwoven in a regular, alternate, overfitted, and interrelated manner.

3. The brake of claim 1 or 2 further including fins extending externally of the friction disc adjacent the external brake cylinders to thereby cool the external brake cylinders as the friction disc rotates.

4. The brake of claim 1 or 2 wherein the piston also includes at least one replaceable pad positioning boss formed on the first face of the piston and extending in the direction of the pins a distance approximately equal to the minimum pad thickness at the desired time of pad replacement to thus cause the positioning boss to rub on the opposed wear surface of the friction disc at the desired time of pad replacement and provide an audible pad replacement signal, with the pins and positioning boss arranged to provide at least three spaced points of replacement pad support to position the pads and aid in preventing the replacement pads from disengaging from the pins.

5. The brake of claim 4 wherein the brake housing includes an external brake cylinder housing for each of the brake cylinders and means to removeably attach the external brake cylinder housing to the remaining portions of the brake housing, with the pins being carried by the external cylinder housing and with the external cylinder housing arranged to allow replacement access to the replaceable pads upon a loosening of the removeable external brake cylinder housing attachment means to thereby allow the replaceable pads to be removed from the pins and replaced without disassembly of the brake.

6. The brake of claim 4 including at least two positioning bosses, with the pins and bosses arranged radially and circumferentially to provide at least four spaced points of replacement pad support.

7. The brake of claim 6 wherein the brake housing includes an external brake cylinder housing for each of the brake cylinders and means to removeably attach the external brake cylinder housing to the remaining portions of the brake housing, with the pins being carried by the external cylinder housing and with the external cylinder housing arranged to allow replacement access to the replaceable pads upon a loosening of the removeable external brake cylinder housing attachment means to thereby allow the replaceable pads to be removed from the pins and replaced without disassembly of the brake.

8. In a brake or clutch device having a device housing and arranged for providing rotational control between the device housing and a shaft, including a hub to be connected to the shaft, a device friction disc, and at least one controlled cylinder arranged to frictionally engage between the friction disc and the device housing to thereby controllably apply power between the device housing and the rotating shaft, the improvement comprising the friction disc arranged longitudinally along the hub, radially around the hub, operationally to the hub, and longitudinally internally of the device, and including internal heat radiating fins, with the heat radiating finned longitudinally internally located friction disc comprising two longitudinally spaced component discs interconnected together only at the hub, with the component discs including at least one cooling air entry port formed therethrough adjacent to the hub, with the heat radiating fins extending generally longitudinally from the surface of the component discs in an opposed, non-touching fashion, internally of the friction disc, but a longitudinal distance less than the longitudinal spacing of the component discs to define an air cooling chamber internally of the friction disc, between the air entry port, around the heat radiating fins, and out of the periphery of the friction disc to allow a serpentine path and passage of cooling air radially and also circumferentially inside the friction disc to allow increased heat transfer, cooling, and device efficiency.

9. The device of claim 8 wherein the heat radiating fins are radially arranged substantially between the hub and the periphery of the friction disc but allowing the passage of air circumferentially about the internal edges of the fins; wherein the component discs and the hub are individual parts; wherein the spaced component discs are of an identical and interchangeable construction; and wherein the heat radiating fins of the spaced component discs are interwoven in a regular, alternate, overfitted, and interrelated manner.

10. The device of claim 9 wherein friction disc mounting holes are provided adjacent the hub, with the mounting holes being out of radial alignment with the heat radiating fins to thus allow the assembly of the friction disc from two identical component discs automatically and to cause the interposition of the heat radiating fins of the two component discs without the necessity of alignment.

11. The device of claim 8, 9 or 10 wherein the device includes external control cylinders, further including fins extending externally of the friction disc adjacent the external control cylinders to thereby cool the external control cylinders as the friction disc rotates.

12. In an external caliper brake including a brake housing and arranged for providing rotational control between the brake housing and a shaft, including a brake friction disc having a center and a periphery, and including a plurality of externally arranged brake cylinders, each including a fluid actuated piston and a replaceable brake pad engaged by the piston to apply a controlled frictional pressure between the brake friction disc and the brake housing, the surfaces of the replaceable brake pads and the brake friction disc comprising opposed wear surfaces, to thereby controllably apply braking power between the brake housing and the rotating shaft, the improved overall brake assembly configuration comprising, in combination:

(a) the brake friction disc arranged generally centrally of the brake cylinders and including at least one cooling air entry port formed in the brake friction disc adjacent the center and at least one cooling air exit formed in the brake friction disc adjacent the periphery, and including internal and opposed heat radiating fins creating a serpentined cooling air path through the friction disc between the air entry port and air exit, allowing increased heat transfer and more efficient braking;

(b) the plurality of external brake cylinders being formed in the brake housing and arranged radially outwardly of the center of the brake friction disc and circumferentially around the center of the brake friction disc; and (c) pin means carried by the brake housing to reciprocally position the brake piston and the replaceable brake pad allowing more rapid brake pad change and ready maintenance of the brake whereby the overall brake assembly configuration provides increased heat transfer and cooling, and a more efficient, lower maintenance brake.

13. The device of claim 12 wherein the heat radiating fins are radially arranged substantially between the center and the periphery of the friction disc but allowing the passage of air circumferentially about the internal edges of the fins; wherein the brake friction disc includes individual, spaced component discs of an identical and interchangeable construction with the heat radiating fins extending generally longitudinally from the component discs in an opposed fashion; and wherein the heat radiating fins of the spaced component discs are interwoven in a regular, alternate, overfitted and inter-related manner.

14. The device of claim 13 further also including fins extending externally of the friction disc adjacent the external brake cylinders to thereby cool the external brake cylinders as the friction disc rotates.

15. The device of claim 12, 13 or 14 wherein the piston also includes at least one replaceable pad positioning boss formed on a first face of the piston adjacent the opposed wear surfaces and extending in the direction of the pin means a distance approximately equal to the minimum pad thickness at the desired time of pad replacement to thus cause the positioning boss to rub on the opposed wear surface of the friction disc at the desired time of pad replacement and provide an audible pad replacement signal, with the pins and positioning boss arranged to provide at least three spaced points of replacement pad support to position the pads and aid in preventing the replacement pads from disengaging from the pin means.

16. The device of claim 15 wherein the brake housing includes an external brake cylinder housing for each of the brake cylinders and means to removeably attach the external brake cylinder housing to the remaining portions of the brake housing, with the pin means being carried by the external cylinder housing and with the external cylinder housing arranged to allow replacement access to the replaceable pads upon a loosening of the removeable external brake cylinder housing attachment means to thereby allow the replaceable pads to be removed from the pin means and replaced without disassembly of the brake.

17. The device of claim 15 including at least two pins and at least two positioning bosses, with the pins and bosses arranged radially and circumferentially to provide at least four spaced points of replacement pad support.

18. The device of claim 17 wherein the brake housing includes an external brake cylinder housing for each of the brake cylinders and means to removeably attach the external brake cylinder housing to the remaining portions of the brake housing, with the pins being carried by the external cylinder housing and with the external cylinder housing arranged to allow replacement access to the replaceable pads upon a loosening of the removeable external brake cylinder housing attachment means to thereby allow the replaceable pads to be removed from the pins and replaced without disassembly of the brake.

19. In an external caliper clutch or brake device including opposed but separated, frictionally engaged wear surfaces, at least one of the wear surfaces including a piston operated, replaceable pad, with the device further including a housing, the improvement comprising, in combination: at least two pins carried by and extending from the housing in the direction of operation of the piston; apertures formed in the piston to receive the pins, the piston being reciprocably mounted on the pins by means of the apertures; with the replaceable pads being mounted on a first face of the piston adjacent the opposed wear surfaces; apertures formed in the replaceable pads to receive the pins, the replaceable pads being reciprocably mounted on the pins by means of the apertures; the pins being of a length sufficient to extend to the end of the piston stroke and a further length to extend into the replaceable pad carried by the piston and to capture and position the replaceable pad over the entire stroke of the piston but of an overall length less than the minimum separation distance between the first face of the piston and the opposed wear surface.

20. The device of claim 19 wherein the piston also includes at least one replaceable pad positioning boss formed on a first face of the piston adjacent the opposed wear surface and extending in the direction of the pins a distance approximately equal to the minimum pad thickness at the desired time of pad replacement to thus cause the positioning boss to rub on the opposed wear surface of the friction disc at the desired time of pad replacement and provide an audible pad replacement signal, with the pins and positioning boss arranged to provide at least three spaced points of replacement pad support to position the pads and aid in preventing the replacement pads from disengaging from the pins.

21. The device of claim 20 wherein the housing includes an external cylinder housing for each piston and means to removeably attach the external cylinder housing to the remaining portions of the housing, with the pins being carried by the external cylinder housing and with the external cylinder housing arranged to allow replacement access to the replaceable pads upon a loosening of the removeable external cylinder housing attachment means to thereby allow the replaceable pads to be removed from the pins and replaced without disassembly of the device.

22. The device of claim 20 including at least two positioning bosses, with the pins and bosses arranged radially and circumferentially to provide at least four spaced points of replacement pad support.

23. The device of claim 22 wherein the housing includes an external cylinder housing for each piston and means to removeably attach the external cylinder housing to the remaining portions of the housing, with the pins being carried by the external cylinder housing and with the external cylinder housing arranged to allow replacement access to the replaceable pads upon a loosening of the removeable external cylinder housing attachment means to thereby allow the replaceable pads to be removed from the pins and replaced without disassembly of the device.

24. In a device for providing rotational control between a first member and a second member, with at least the first member being rotatable about an axis means, with the first member including a friction disc for controlled, selective contact with a friction engagement surface on the second member, wherein the improvement comprises an improved friction disc comprising, in combination: a first component disc having an inner surface, an outer surface, a center, and a periphery; a second component disc having an inner surface, an outer surface, a center, and a periphery; means for interconnecting the first component disc to the second component disc solely adjacent to the axis means of the first member with the second component disc being spaced from the first component disc at all points radially from the axis means of the first member; with at least the first component disc including heat radiating fins extending in a generally radial direction from adjacent the center and on the inner surface of the first component disc, with the length of the heat radiating fins from the inner surface of the first component disc being less than the spacing between the first and second component discs to prevent thermal contact of the heat radiating fins of the first component disc with the second component disc which would allow direct heat transfer therebetween; at least one cooling air entry port formed in at least one of the first and second component discs adjacent the center of the member, with an air cooling chamber being defined between the inner surfaces of the first and second component discs between the air entry port and the periphery of the first and second component discs wherein as the first member is rotated about its axis, air can enter the air cooling chamber through the cooling air entry port, pass through the air cooling chamber by a serpentine path radially and circumferentially between the first and second component disc and around the heat radiating fins, and past the periphery of the first and second component discs to allow increased heat transfer, cooling, and efficiency of the device.

25. The device of claim 24 further comprising heat radiating fins extending in a generally radial direction from the center and on the inner surface of the second component disc, with the length of the heat radiating fins from the inner surface of the second component disc being less than the spacing between the first and second component discs to prevent contact of the heat radiating fins of the second component discs with the first component disc which would allow direct heat transfer therebetween, with the heat radiating fins of the first and second component discs being in a meshed but spaced relation in the air cooling chamber to prevent contact between the heat radiating fins of the first and second component discs which would allow direct heat transfer therebetween and to force the cooling air to alternatelty pass over the heat radiating fins of the first and second component disc during circumferential movement in the air cooling chamber while also allowing radial movement of cooling air.

26. The device of claim 25 wherein the heat radiating fins of the first and second component discs are interwoven in a regular, alternate, overfitted, and interrelated manner.

27. The device of claim 26 wherein the first and second component discs of the friction disc are individual parts and are of an identical and interchangeable construction and wherein the friction disc mounting includes mounting holes to assemble the component discs, with the mounting holes being out of radial alignment with the heat radiating fins to thus allow the assembly of the friction disc from the component discs automatically and to cause the interposition of the heat radiating fins of the two comonent discs without the necessity of alignment.

28. The device of claims 24, 25, or 26 wherein the first and second component discs are individual parts and are of an identical and interchangeable construction.

29. The device of claim 24, 25, or 26 wherein the first member is a rotatable shaft, with the shaft including a hub operationally connected thereto, and wherein the friction disc is operationally connected to the hub.

30. The device of claim 24, 25, or 26 wherein the second member is a stationary housing so the device operates in a braking function.

31. The device of claim 30 wherein the controlled selective contact is obtained by a cylinder reciprocal with the stationary housing, with the friction engagement surface of the second member being formed on the reciprocal cylinder.

32. The device of claim 24, 25, or 26 wherein the controlled selective contact is obtained by an external cylinder, also including fins extending externally of the friction disc adjacent the external cylinders to thereby cool the external cylinders as the friction disc rotates.

* * * * *